Figure 1:
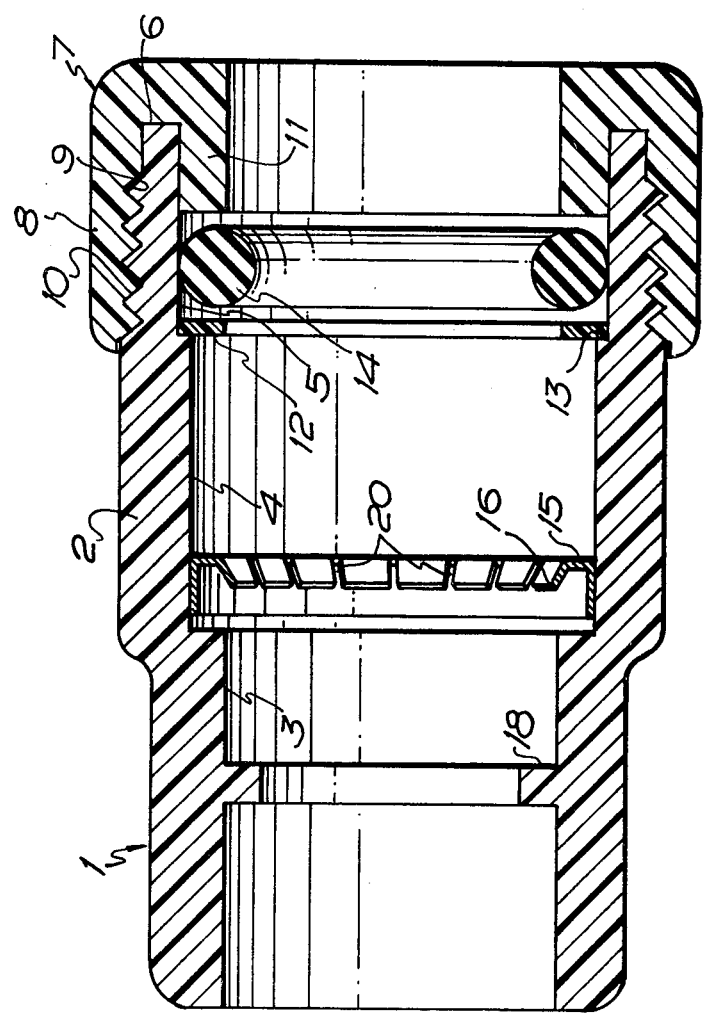

United States Patent [19]
Elliott

[11] 4,072,328
[45] Feb. 7, 1978

[54] PIPE COUPLINGS

[75] Inventor: David Robert Elliott, Burnley, England

[73] Assignee: Hepworth Plastics Limited, Sheffield, England

[21] Appl. No.: 689,833

[22] Filed: May 25, 1976

[51] Int. Cl.² ............... F16L 27/00; F16L 47/02
[52] U.S. Cl. ................. 285/169; 285/302; 285/340; 285/354; 285/423
[58] Field of Search ........... 285/340, 354, 353, 302, 285/321, 169, 423

[56] References Cited
U.S. PATENT DOCUMENTS

| 1,817,776 | 8/1931 | Sipe | 285/340 |
| 2,971,781 | 2/1961 | Torres | 285/353 X |
| 3,075,792 | 1/1963 | Franck | 285/354 X |
| 3,233,925 | 2/1966 | Stevens | 285/340 |
| 3,976,314 | 8/1976 | Graham | 285/340 X |

FOREIGN PATENT DOCUMENTS

| 1,925,171 | 11/1969 | Germany | 285/340 |
| 1,029,123 | 5/1966 | United Kingdom | 285/340 |
| 1,081,702 | 8/1967 | United Kingdom | 285/340 |

Primary Examiner—Thomas F. Callaghan
Attorney, Agent, or Firm—Lowe, King, Price & Markva

[57] ABSTRACT

A pipe coupling particularly for use in connecting plastics piping having an appreciable coefficient of thermal expansion and required to withstand appreciable pressures, and avoiding the need for an internal groove for housing a sealing ring in the coupling which would require machining or a collapsible core, comprises a socket portion with two internal radial enlargements, an end cap having an outer portion secured on the outside of the socket portion and an inner portion with an internal diameter substantially equal to that of the initial bore, a washer adjacent a shoulder at the junction between the enlargements and having an internal diameter substantially equal to that of the bore, a resilient sealing ring housed between the inner portion of the end cap and the washer, and a toggle ring slidable along the first enlargement and having an aperture smaller in diameter than that of the bore, so that a pipe-end inserted into the socket makes sealing contact with the sealing ring and is gripped by the toggle ring, which however, remains free to slide along the first enlargement as the pipe-end moves relative to the socket portion in consequence of expansion or contraction, and the toggle ring maintains the pipe-end substantially coaxial with the bore so that the sealing contact with the sealing ring cannot be broken, or the pipe-end forced or pulled out of the socket portion.

9 Claims, 3 Drawing Figures

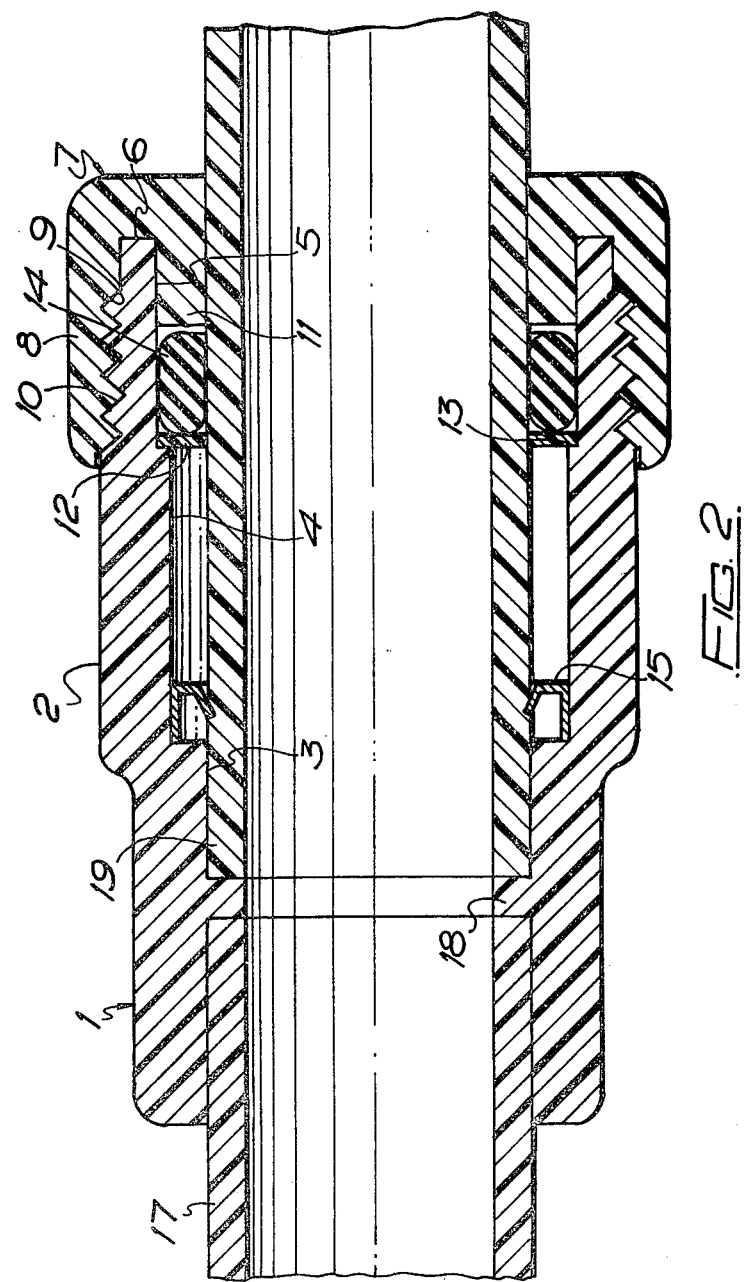

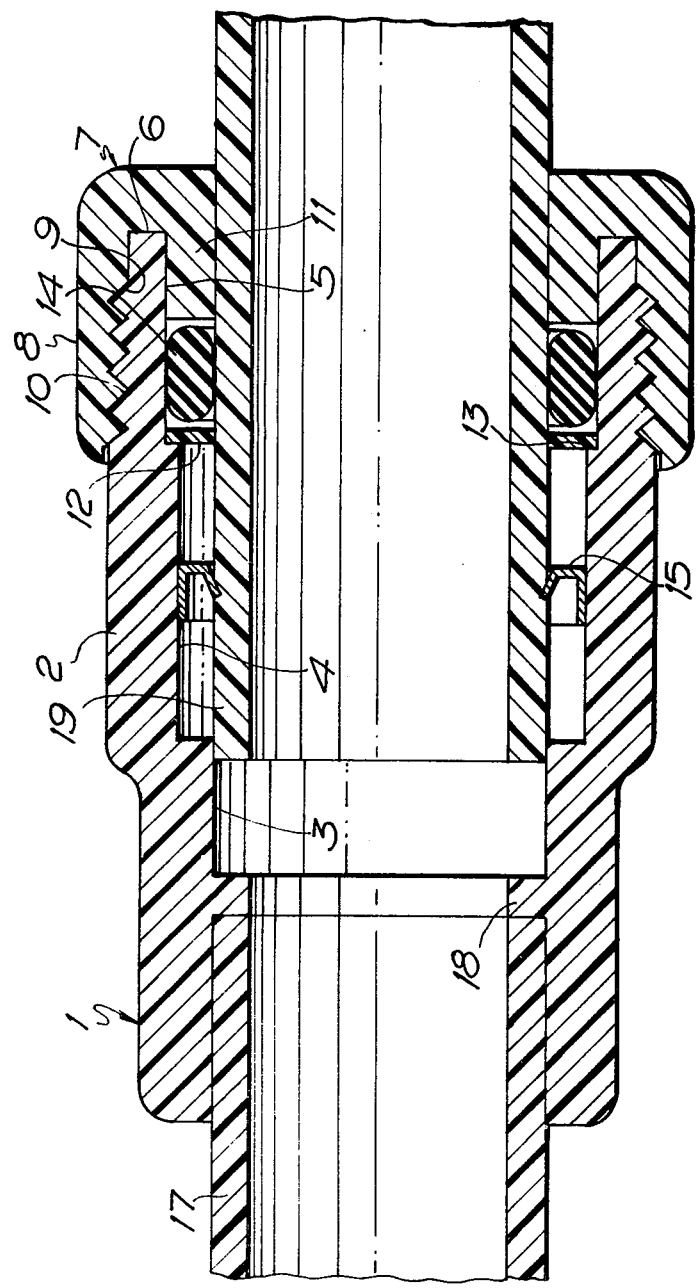

PIPE COUPLINGS

This invention relates to pipe couplings, particularly for use in connecting plastics piping having an appreciable coefficient of thermal expansion and required to withstand appreciable pressures.

An object of the invention is to avoid the need for an internal groove for housing a sealing ring in the coupling which would require machining or a collapsible core, so that the parts of the coupling can be readily moulded.

According to the present invention, a pipe coupling comprises a socket portion at one end of a bore, with a first internal radial enlargement adjacent the bore and a second radial enlargement adjacent the end of the socket portion remote from the bore, and end cap having an outer portion adapted to be secured on the outside of the socket portion and an inner portion with an internal diameter substantially equal to that of the bore, a washer adjacent a shoulder at the junction between the enlargements and having an internal diameter substantially equal to that of the bore, a resilient sealing ring housed between the inner portion of the end cap and the washer, and a toggle ring slidable along the first enlargement and having an aperture smaller in diameter than that of the bore.

Thus, a pipe-end which is intended to be inserted into the socket, i.e., is a close sliding fit in the bore (and through the inner portion of the end cap and the washer), makes sealing contact with the sealing ring and is gripped by the toggle ring, which, however, remains free to slide along the first enlargement as the pipe-end moves relative to the socket portion in consequence of expansion or contraction, and the toggle ring maintains the pipe-end substantially coaxial with the bore so that the sealing contact with the sealing ring cannot be broken, or the pipe-end forced or pulled out of the socket portion.

The toggle ring is preferably provided with slits extending from its aperture to enable it to open to facilitate insertion of a pipe-end.

The bore may be formed with a constriction or other internal projection for abutment by a pipe end upon first insertion into the socket portion, so as to determine the position on the pipe-end at which the toggle ring will grip.

The outer portion of the end cap is preferably internally screw-threaded and the outside of the socket portion provided with mating external screw-threads, but the end cap could alternatively be secured by adhesive or welded on the socket portion.

The inner portion of the end cap preferably extends inside the second enlargement in the socket portion, but the space between the end face of the inner portion of the end cap and the washer against the shoulder at the junction between the enlargements preferably has a greater axial length that that of the sealing ring, which is preferably an O-ring.

The socket portion may be formed integrally with one end of a length of pipe, the bore then being the bore of the pipe. Alternatively, the socket portion may be part of a coupling sleeve adapted to be secured on one end of a length of pipe, in which case a circumferential rib in the bore of the coupling sleeve may serve as a stop for the length of pipe on which the coupling sleeve is to be secured, as well as a stop for the inserted pipe-end.

An embodiment of the invention will now be described, by way of example only, with reference to the accompanying drawings, in which FIG. 1 is a longitudinal section of a pipe coupling sleeve in accordance with the invention;

FIG. 2 corresponds to FIG. 1 but shows the sleeve secured on one end of a length of pipe and a pipe-end fully inserted in the socket of the coupling sleeve; and FIG. 3 corresponds to FIG. 2 but shows the inserted pipe-end withdrawn to an intermediate position.

In FIG. 1, a pipe coupling sleeve 1 has a socket portion 2 at one end of a bore 3, with a first internal radial enlargement 4 and a second radial enlargement 5 adjacent the end 6 of the socket portion remote from the bore 3, an end cap 7 having an outer portion 8 with an internal screw-thread 9 mating with an external screw-thread 10 on the outside of the socket portion and an inner portion 11 with an internal diameter substantially equal to that of the bore 3, a washer 12 adjacent a shoulder 13 at the junction between the enlargements 4, 5 and having an internal diameter substantially equal to that of the bore 3, a resilient sealing ring 14 housed between the end face of the inner portion 11 of the end cap 7 and the washer 12, and a toggle ring 15 slidable along the first enlargement 4 and having an aperture 16 smaller in diameter than that of the bore. The inner portion 11 of the end cap 7 extends inside the second enlargement 5 in the socket portion 2, but the axial length of the space between the end face of the inner portion 11 and the washer 12 is greater than that of the sealing ring 14, which is an O-ring.

The coupling sleeve 1 is shown in FIGS. 2 and 3 secured on one end of a length of pipe 17, an internal circumferential rib 18 in the bore 3 serving as a stop for the length of pipe 17, as well as a stop for an inserted pipe-end 19, which when initially fully inserted determines the position at which the toggle ring 15 grips the pipe-end (FIG. 2). The pipe-end 19 is a close sliding fit in the bore 3 (and through the inner portion 11 of the end cap 7 and the washer 12) and makes sealing contact with the sealing ring. The toggle ring 15, which grips the pipe-end 19, remains free to slide along the first enlargement 4 as the pipe-end moves relative to the socket portion 2 in consequence of expansion or contraction from an intermediate position (FIG. 3) to which it is withdrawn after initially being fully inserted, and the toggle ring 15 maintains the pipe-end 19 substantially coaxial with the bore 3 so that the sealing contact with the sealing ring 14 cannot be broken, or the pipe-end 19 forced or pulled out of the socket portion.

The sleeve 1 and end-cap 7 are formed of plastics material, the washer 12 and the toggle ring 15 are formed of steel, and the sealing ring 14 is of rubber (natural or synthetic). The length of pipe 17 is of plastics material compatible with the plastics material of the sleeve 1 and secured in the sleeve by suitable adhesive or by solvent cement or heat welding. The pipe-end 19 may be of plastics material different from or similar to the plastics material of the sleeve 1 and may be part of a length of pipe the other end of which is provided with a similar coupling sleeve. The toggle ring 15 is provided with slits 20 extending from its aperture 16 to enable it to open to facilitate insertion of the pipe-end 19.

What I claim is:

1. A pipe coupling comprising a socket portion at one end of a bore, with a first internal radial enlargement adjacent the bore, a first shoulder being defined between said first enlargement and said bore, and a second radial enlargement adjacent the end of the socket portion remote from the bore, an end cap having an opening through which a pipe is inserted into the bore, said end cap having an outer portion adapted to be secured on the outside of the socket portion and an inner portion with an internal diameter substantially equal to that of the bore, a washer adjacent a second shoulder at the junction between the enlargements and having an internal diameter substantially equal to that of the bore, a resilient sealing ring housed between the inner portion of the end cap and the washer, and a toggle ring located between said washer and said first shoulder, said toggle ring being slidable along the first enlargement and having an aperture smaller in diameter than that of the bore, said resilient sealing ring providing a seal between a wall of said second enlargement and the pipe on a portion of said pipe located between said end cap and said slidable toggle ring.

2. A pipe coupling as in claim 1, wherein the toggle ring is provided with slits extending from its aperture to enable it to open to facilitate insertion of a pipe-end.

3. A pipe coupling as in claim 1, wherein the bore is formed with a constriction or other internal projection for abutment by a pipe end upon first insertion into the socket portion.

4. A pipe coupling as in claim 1, wherein the outer portion of the end cap is internally screw-threaded and the outside of the socket portion provided with mating external screw-threads.

5. A pipe coupling as in claim 1, wherein the inner portion of the end cap extends inside the second enlargement in the socket portion.

6. A pipe coupling as in claim 5, wherein the space between the inner portion of the end cap and the washer against the shoulder at the junction between the enlargements has a greater axial length than that of the sealing ring.

7. A pipe-coupling as in claim 6, wherein the sealing ring is an O-ring.

8. A pipe coupling as in claim 1, wherein the socket portion is part of a coupling sleeve adapted to be secured on one end of a length of pipe.

9. A pipe coupling as in claim 8, wherein an internal circumferential rib is provided in the bore of the coupling sleeve and serves as a stop for the length of pipe on which the coupling sleeve is to be secured.

* * * * *